US012786621B2

(12) United States Patent
Tan

(10) Patent No.: US 12,786,621 B2
(45) Date of Patent: Nov. 3, 2026

(54) PROCESSING METHOD AND DEVICE

(71) Applicant: Lenovo (Beijing) Limited, Beijing (CN)

(72) Inventor: Qing Tan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 260 days.

(21) Appl. No.: 18/446,022

(22) Filed: Aug. 8, 2023

(65) Prior Publication Data

US 2024/0048901 A1 Feb. 8, 2024

(30) Foreign Application Priority Data

Aug. 8, 2022 (CN) ......................... 202210945334.0

(51) Int. Cl.
*H04R 3/00* (2006.01)
*G06F 3/16* (2006.01)

(52) U.S. Cl.
CPC ............... *H04R 3/00* (2013.01); *G06F 3/165* (2013.01); *H04R 2430/01* (2013.01)

(58) Field of Classification Search
CPC . G06F 16/00; G06F 3/165; G06F 8/70; G06F 9/445; G06Q 10/10; G06Q 30/0601; G09B 5/06; G09B 7/00; G09B 7/04; G09B 9/02; H04R 2430/01; H04R 3/00; H04R 3/005
USPC ......................................... 381/56–58; 700/94
See application file for complete search history.

(56) References Cited

U.S. PATENT DOCUMENTS

2013/0136269 A1* 5/2013 Sakamoto .............. H03B 29/00 381/71.4
2017/0332297 A1* 11/2017 Nagasaka ......... H04W 36/0088

* cited by examiner

*Primary Examiner* — Lun-See Lao
(74) *Attorney, Agent, or Firm* — ANOVA LAW GROUP, PLLC

(57) ABSTRACT

A processing method includes detecting whether a condition is satisfied and in response to the condition being satisfied, controlling an electronic device to switch from a first state to a second state. In the first state, the electronic device is configured to output a first audio from a first communication object with a first parameter and a second audio from a second communication object with a second parameter. In the second state, the electronic device is configured to output the first audio from the first communication object with a third parameter and the second audio from the second communication object with a fourth parameter. Switching the electronic device from the first state to the second state includes adjusting the first parameter to the third parameter in a first method and adjusting the second parameter to the fourth parameter in a second method.

20 Claims, 4 Drawing Sheets

PROCESSING METHOD AND DEVICE

CROSS-REFERENCE TO RELATED APPLICATION

The present disclosure claims priority to Chinese Patent Application No. 202210945334.0, filed on Aug. 8, 2022, the entire content of which is incorporated herein by reference.

TECHNICAL FIELD

The present disclosure relates to a data processing method and a device.

BACKGROUND

In a multi-person video conference scene, since conditions such as speaking habits of participants, surrounding environments, and terminal devices are different, a participant hears different volumes and sounds from other participants. In some cases, a voice of a certain participant is too quiet, which causes other participants to be not able to understand the speech of the participant. In some other cases, a voice of a certain participant is too loud, which causes discomfort to other participants.

SUMMARY

Embodiments of the present disclosure provide a processing method. The method includes detecting whether a condition is satisfied and in response to the condition being satisfied, controlling an electronic device to switch from a first state to a second state. In the first state, the electronic device is configured to output a first audio from a first communication object with a first parameter and a second audio from a second communication object with a second parameter. In the second state, the electronic device is configured to output the first audio from the first communication object with a third parameter and the second audio from the second communication object with a fourth parameter. Switching the electronic device from the first state to the second state includes adjusting the first parameter to the third parameter in a first method and adjusting the second parameter to the fourth parameter in a second method. The first method and the second method are different. The first parameter is different from the third parameter.

Embodiments of the present disclosure provide an electronic device, including one or more memories and one or more processors. The one or more memories store program codes that, when executed by the one or more processors, cause the one or more processors to detect whether a condition is satisfied and in response to the condition being satisfied, control an electronic device to switch from a first state to a second state. In the first state, the electronic device is configured to output a first audio from a first communication object with a first parameter and a second audio from a second communication object with a second parameter. In the second state, the electronic device is configured to output the first audio from the first communication object with a third parameter and the second audio from the second communication object with a fourth parameter. Switching the electronic device from the first state to the second state includes adjusting the first parameter to the third parameter in a first method and adjusting the second parameter to the fourth parameter in a second method. The first method and the second method are different. The first parameter is different from the third parameter.

Embodiments of the present disclosure provide a non-transitory computer-readable storage medium storing a computer program that, when executed by one or more processors, causes the one or more processors to detect whether a condition is satisfied and in response to the condition being satisfied, control an electronic device to switch from a first state to a second state. In the first state, the electronic device is configured to output a first audio from a first communication object with a first parameter and a second audio from a second communication object with a second parameter. In the second state, the electronic device is configured to output the first audio from the first communication object with a third parameter and the second audio from the second communication object with a fourth parameter. Switching the electronic device from the first state to the second state includes adjusting the first parameter to the third parameter in a first method and adjusting the second parameter to the fourth parameter in a second method. The first method and the second method are different. The first parameter is different from the third parameter.

Embodiments of the present disclosure provide the processing method and the device. The method includes detecting whether a condition is satisfied and in response to the condition being satisfied, controlling an electronic device to switch from a first state to a second state. In the first state, the electronic device is configured to output a first audio from a first communication object with a first parameter and a second audio from a second communication object with a second parameter. In the second state, the electronic device is configured to output the first audio from the first communication object with a third parameter and the second audio from the second communication object with a fourth parameter. The above solution enables the electronic device to output the plurality of received audios in a volume-balanced method when a specific condition is satisfied. Thus, the output parameters of the audios from different communication objects may not differ too much, which avoids auditory discomfort for the user. Moreover, the user does not need to adjust the output volume repeatedly during remote audio interactions. Thus, the user experience can be greatly optimized.

DETAILED DESCRIPTION OF THE EMBODIMENTS

The technical solutions of embodiments of the present disclosure are described in detail below in connection with the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

Embodiments of the present disclosure can be applied to an electronic device. A product form of the electronic device is not limited by the present disclosure. The electronic device can include but is not limited to a smartphone, a tablet computer, a wearable device, a personal computer (PC), and a netbook, which can be selected as needed.

Figure 1:
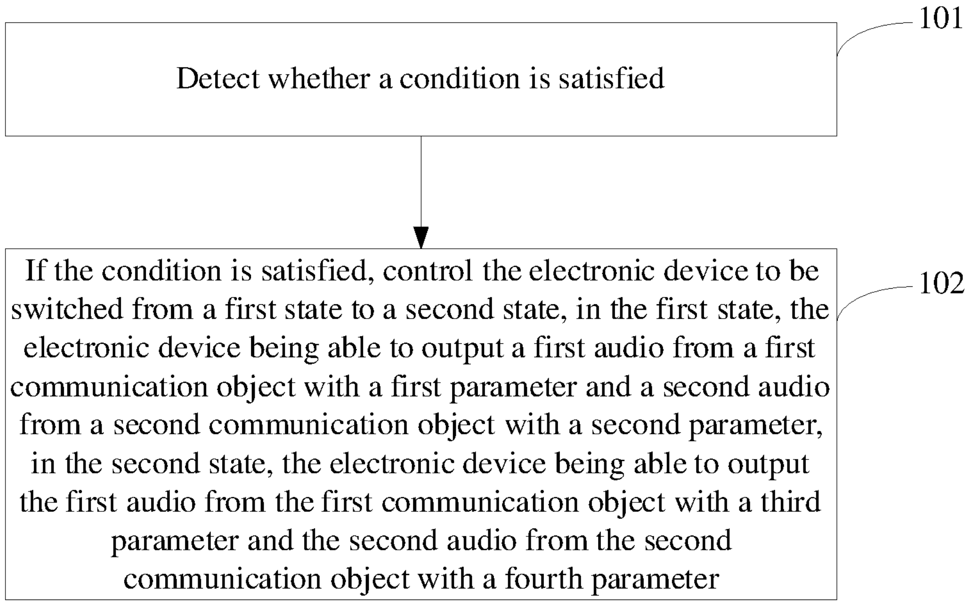
FIG. 1 illustrates a schematic flowchart of a processing method according to some embodiments of the present disclosure.

FIG. 1 illustrates a schematic flowchart of a processing method according to some embodiments of the present disclosure. As shown in FIG. 1, the processing method includes the following processes.

At 101, whether a condition is satisfied is detected.

The condition is used for the system to determine whether adjustment needs to be performed for an output parameter of a first audio and/or a second audio. In embodiments of the present disclosure, the condition can be satisfied but is not limited to when at least one of a user operation instruction, a difference between same parameters of any two or more of a plurality of audios exceeding a first threshold, or a parameter of at least one of the plurality of audios exceeding a second threshold is satisfied.

At 102, if the condition is satisfied, the electronic device is controlled to be switched from a first state to a second state. In the first state, the electronic device is able to output a first audio from a first communication object with a first parameter and a second audio from a second communication object with a second parameter. In the second state, the electronic device is able to output the first audio from the first communication object with a third parameter and the second audio from the second communication object with a fourth parameter.

Switching the electronic device from the first state to the second state can include adjusting the first parameter to the third parameter in a first method and adjusting the second parameter to the fourth parameter in a second method. The first method and the second method are different. An object to be adjusted can be a parameter, which represents an output volume of an audio.

In some embodiments, adjusting the first parameter to the third parameter in the first method can include that the first parameter is greater than the third parameter or the third parameter is greater than the first parameter. Adjusting the second parameter to the fourth parameter in the second method can include that the second parameter is greater than the fourth parameter, the second parameter is less than the fourth parameter, or the second parameter is equal to the fourth parameter.

The first method and the second method being different can include but are not limited to, at least one of adjustment trends for audio parameters being inconsistent, adjustment magnitudes for the audio parameters being inconsistent, or adjustment ratios for the audio parameters being inconsistent.

The first parameter and the third parameter can be different, and the second parameter and the fourth parameter can be the same or different. That is, when the condition is detected to be satisfied, an output parameter of at least one audio of the plurality of received audios needs to be adjusted.

The processing method of embodiments of the present disclosure can be applied in various scenes, such as audio or video interactions between the electronic device and a remote device. At least two remote interaction objects can be included, that is the first communication object and the second communication object. The first audio of the first communication object and the second audio of the second communication object can be from two different terminal devices or a same terminal device, corresponding to different sound sources. Since speaking volumes, habits, and the terminal devices of different communication objects are different, a sound corresponding to audio data of a communication object can be loud, and a sound corresponding to audio data of another communication object can be soft, which significantly affects the user experience. Thus, adjustment needs to be performed accordingly on the output parameter of the first audio and the output parameter of the second audio before outputting the first audio and the second audio. Then, the output effects of the first audio and the second audio that are outputted may not differ too much.

The processing method can also be applied in an amplification and playback scene of an offline large-space event. A plurality of microphones can be set to capture on-site audio data in the scene. Then, the audio data can be transmitted to the electronic device for output. Many people can be in the scene and can be in different positions from the microphones. Thus, some people can have loud voices and some other people can have soft voices in the collected audio data. If the electronic device does not perform any adjustment processing and directly output the audio data, the outputted audio can be sometimes loud and sometimes soft, which affects the normal progress of the event. Thus, the output parameters of the audios of the plurality of persons can be adjusted through the technical solution of the present disclosure.

Adjustment of the output parameters of the first audio and the second audio is described in detail below, which is not described in detail here. The processing method of the present disclosure can only be applied to a specific application, such as processing of the remote education application and remote video conference application during application processes. In the processing method, only the received audio of the application can be adjusted, and other output voices of other audio applications (e.g., video application and music application) in the electronic device may not be affected.

The processing method embodiments of the present disclosure can include controlling the electronic device to output the plurality of received audios in a balanced volume method under specific conditions. Thus, the output parameters of the plurality of audios from different communication objects may not differ too much, which avoids auditory discomfort for the user, and the user does not need to adjust the output volume repeatedly during remote audio interactions. Thus, the user experience can be greatly optimized.

Figure 2:
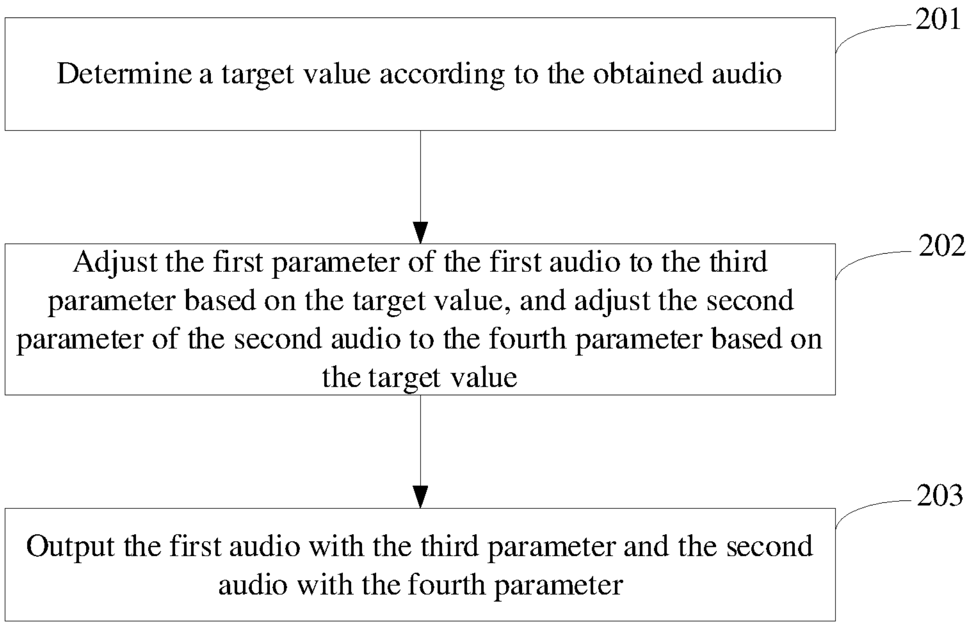
FIG. 2 illustrates a schematic flowchart of controlling an electronic device to switch a state according to some embodiments of the present disclosure.

FIG. 2 illustrates a schematic flowchart of controlling an electronic device to switch a state according to some embodiments of the present disclosure. As shown in FIG. 2, controlling the electronic device to switch from the first state to the second state includes the following processes.

At 201, a target value is determined according to the obtained audio.

The target value may not be a fixed value. The target value can be a value that changes dynamically based on the periodicity of the obtained audio. The target value can represent the output volume of the audio.

In some embodiments, when at least two pieces of audio data are included at the same time, determining the target value according to the obtained audio can include averaging at least two volume values of audio sampling data from different communication objects corresponding to the current sampling period to obtain the target value corresponding to the current sampling period. The sampling period can be set based on the accuracy requirement of the application scene, which is not limited by the present disclosure.

For example, during the same time period, the first audio and the second audio can be received. The volume value of the first audio can be 65 dB, and the volume value of the second audio can be 45 dB. The target value of the time period can be an average value of the volume value of the first audio and the volume value of the second audio, i.e., (65+45)/2=55 dB. Similarly, when three or more audios are received in the same time period, an average value of volume values of all received audios in the time period can be used as the target value.

At 202, the first parameter of the first audio is adjusted to the third parameter based on the target value, and the second parameter of the second audio is adjusted to the fourth parameter based on the target value.

After the target value is determined, the electronic device can be controlled to be switched from the first state to the second state based on the target value. That is, the output parameters of the first audio and/or the second audio can be adjusted. In practical applications, since the target value is periodically updated, adjustment parameters for adjusting the audios can also dynamically change. The adjustment of the output parameter of the audio in the current sampling period can be determined based on the target value in a last sampling period.

For example, if the first target value determined in the first sampling period is 50 dB, audio A of communication object A and audio B of communication object B can be received in the second sampling period. A volume value of audio A can be 56 dB, and a volume value of audio B can be 20 dB. Then, the volume value of audio A can be reduced by 6 dB, and the volume value of audio B can be increased by 30 dB. A second target value of the second sampling period can be (56+20)/2=38 dB. Then, volume values of all received audios can be adjusted to 38 dB in the third sampling period, and so on.

At 203, the first audio is outputted with the third parameter, and the second audio is outputted with the fourth parameter.

After the output parameters of the first audio and the second audio are determined, the first audio and the second audio can be directly outputted based on the output parameters.

In addition to the method for determining the target value described above, the target value can be determined in other methods. In practical application scenes, such as the remote conference scene, the plurality of participants usually do not speak at the same time but take turns. Thus, only one piece of audio data can be received at a particular time point. Then, the target value can be determined according to the obtained audio. Determining the target value according to the received audio can include determining a volume value of the first audio sampling data as a target value of the first sampling period for the first audio sampling data of the received audio data, and determining an average value of a volume value of the current audio sampling data and the target value of the last sampling period as the target value of the current sampling period for other audio sampling data except for the first audio sampling data in the received audio sampling data.

That is, the electronic device can start to determine the target value when begins to receive the audio. In the first sampling period, the volume value of the audio data obtained in the first sampling can be directly determined as the target value. Starting from the second sampling period, the average of the volume value of the audio sampling data in the current sampling period and the target value of the last sampling period can be calculated as the target value of the current sampling period. Then, the target value that is updated dynamically can be obtained with the audio sequence.

In a scene, the communication object can move when the communication object speaks. Thus, a distance between the communication object and the microphone can change, and the volume of the audio that is collected and transmitted to the current electronic device can be sometimes loud and sometimes soft. After the target value is determined in the target value determination method and the output volume of the audio is adjusted correspondingly, the volume may not be sometime loud and sometimes soft in the entire audio output process. In addition, after the first communication object ends speaking, for the case that the second communication object can speak loud or soft, due to the last target value determined for the first communication object, the original loud voice of the second communication object can be lowered, or the original soft voice of the second communication object can be increased. Thus, when different communication objects switch to speak, the voices before and after may not differ too much. In some embodiments, for a blank period between different communication objects, or a blank period between different audio segments of a same communication object, processing may not be performed, the last target value determined in the last audio can be retained and applied in adjusting the output parameter of the next audio that is subsequently received.

In embodiments of the present disclosure, by determining the target value, when the audios of different objects are switched or the volume of the same audio suddenly changes significantly, the output volume may not change obviously but may be transitioned smoothly as a whole. Moreover, by adjusting the target value dynamically, a dynamic effect of the audio before adjusting the output parameter can be retained.

In some embodiments, the adjustment of the output parameter of the received audio can only include an adjustment of a portion of the audio data, not the entire audio data. In some embodiments, the received average value of the volume value of the last audio segment can be determined as the target value, or the target value can be a predetermined value. Then, after a new audio is received, based on the target value, the output parameter of the audio data that exceeds a certain range of the target value can be adjusted, and the audio data that does not exceed the range of the target value may not be processed.

Figure 3:
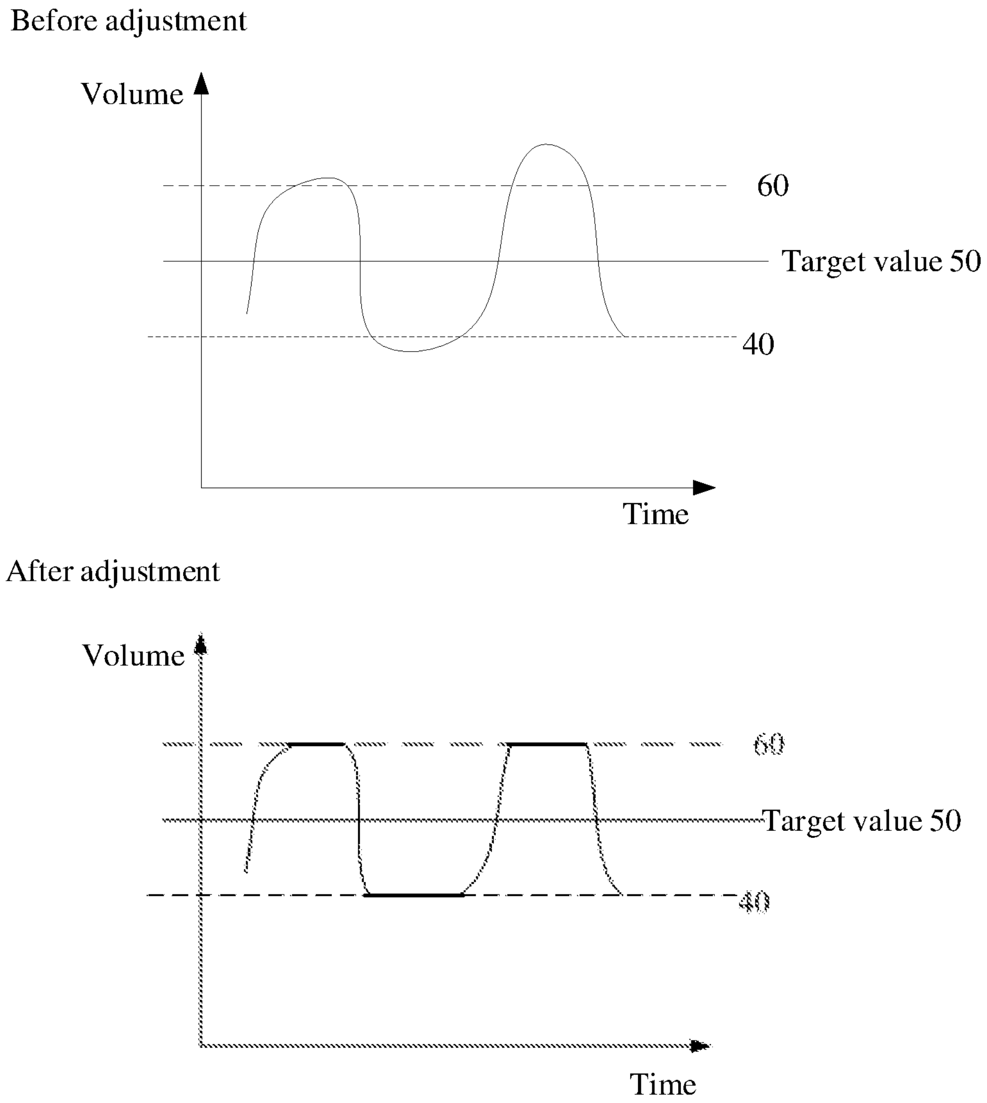
FIG. 3 illustrates a schematic comparison diagram of curves before or after adjusting an output volume according to some embodiments of the present disclosure.

For example, if the target value is set to 50 dB, and the range is set to 10 dB, any audio data exceeding 60 dB can be adjusted down to 60 dB, and any audio data below 40 dB can be adjusted up to 40 dB. FIG. 3 illustrates a schematic comparison diagram of curves before or after adjusting an output volume according to some embodiments of the present disclosure.

In some embodiments, the output parameter of the audio can also be adjusted based on ratios. For example, the target value is determined to be 30 db in the last sampling period, or the predetermined target value can be 30 db. When the first audio sampling data of the audio received in the current sampling period is 60 db, a ratio coefficient of the target value to the actual volume can be 0.5. Thus, the output volume of all the audio sampling data of the current sampling period can be multiplied by 0.5 to obtain the output volume.

Controlling the electronic device to switch from the first state to the second state can include obtaining an adjustment instruction and adjusting the output parameter of the first audio from the first communication object from the first parameter to the third parameter according to the adjustment instruction. The adjustment instruction can be an instruction associated with an identification of the first communication object on the interface.

In some embodiments, the adjustment of the audio output parameter can be triggered manually by the user. In the remote conference scene, the screen of the electronic device can display the application interface. A portion of the screen can be a video display area, and a portion of the screen can be a function setting area, or the function setting page can be hidden and can be called by triggering a specific button on the application interface. The user can directly control and adjust the audio output parameter on the function setting page.

Figure 4:
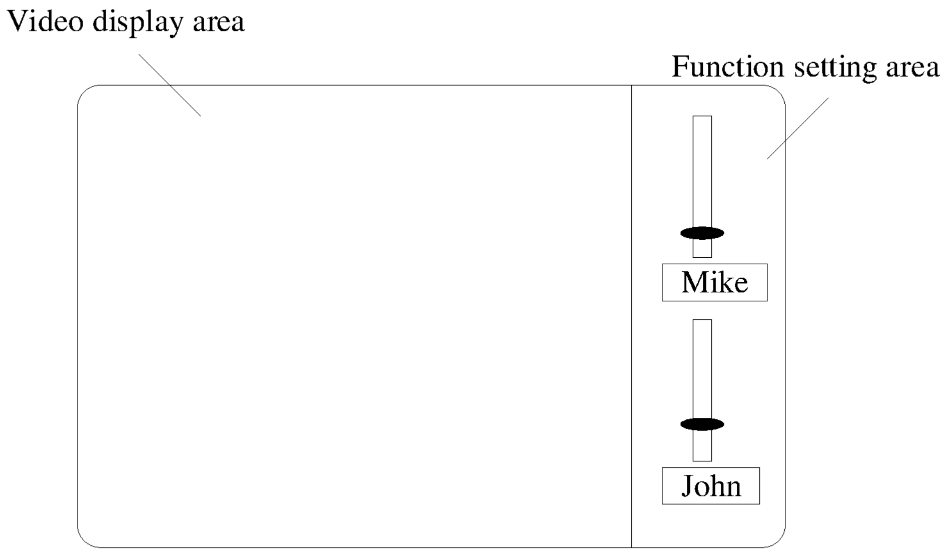
FIG. 4 illustrates a schematic diagram of an application interface of a remote conference according to some embodiments of the present disclosure.

FIG. 4 illustrates a schematic diagram of an application interface of a remote conference according to some embodiments of the present disclosure. Identifications of different communication objects are identified on the function setting page. Each communication object corresponds to an output volume adjustment object. The user can directly click and drag the output volume adjustment button (black structure in FIG. 4) to control the output volume of the audio of the corresponding communication object.

In some embodiments, controlling the electronic device to switch from the first state to the second state can include determining an audio parameter adjustment reference according to at least one of historical data, environmental data, or received audio data and adjusting the output parameter of the first audio and the output parameter of the second audio based on the adjustment reference.

The historical data can refer to the audio output volume data during past remote audio interactions. The environmental data can represent the noise level surrounding the user. The historical data can be used to represent the output volume that the user likes to receive. The environment data can be used as the adjustment reference to determine a reference object. In general, in a noisy environment, to clearly capture the content of the output audio, the output volume of the audio may need to be turned up. In a quiet environment, the output volume of the audio can be appropriately turned down.

Method embodiments can be described as a series of actions to facilitate simple description. However, those skilled in the art should understand that the present disclosure is not limited by the described action sequence. According to the present disclosure, some steps can be performed in another sequence or simultaneously. Furthermore, those skilled in the art should also understand that described embodiments are some embodiments of the present disclosure, and involved actions and modules are not necessary for the present disclosure.

The method is described in detail in embodiments of the present disclosure. The method of the present disclosure can be realized using a plurality of forms of devices. Thus, the present disclosure further provides a device, which is described in detail with specific embodiments.

Figure 5:
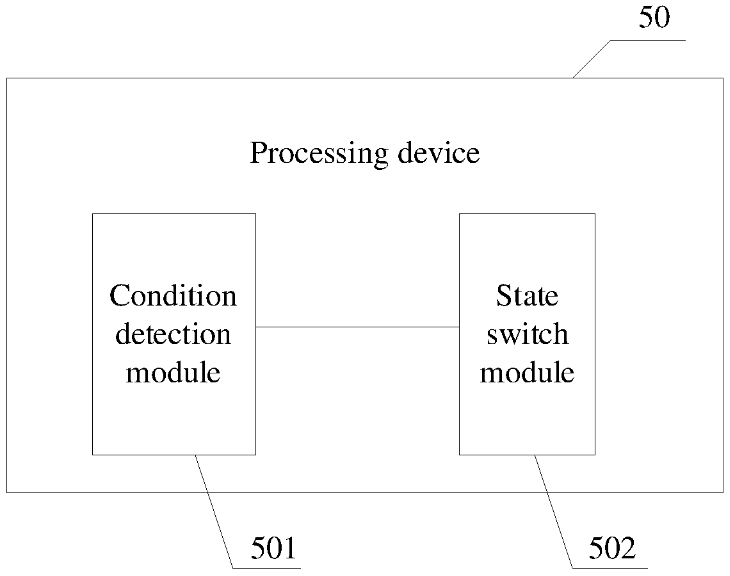
FIG. 5 illustrates a schematic structural diagram of a processing device according to some embodiments of the present disclosure.

FIG. 5 illustrates a schematic structural diagram of a processing device 50 according to some embodiments of the present disclosure. As shown in FIG. 5, the processing device 50 includes a condition detection module 501 and a state switch module 502.

The condition detection module 501 can be configured to detect whether the condition is satisfied.

The state switch module 502 can be configured to control the electronic device to switch from the first state to the second state when the condition detection module detects that the condition is satisfied. In the first state, the electronic device can output the first audio from the first communication object using the first parameter and the second audio from the second communication object using the second parameter. In the second state, the electronic device can output the first audio from the first communication object using the third parameter and the second audio from the second communication object using the fourth parameter.

Switching the electronic device from the first state to the second state can include adjusting the first parameter to the third parameter in a first method and adjusting the second parameter to the fourth parameter in the second method. The first method can be different from the second method.

The first parameter can be different from the third parameter.

The processing device of embodiments of the present disclosure can be configured to, when a specific condition is satisfied, control the electronic device to output the plurality of received audios in a balanced volume method. Thus, the output parameters of the plurality of audios from different communication objects may not differ too much, which avoids auditory discomfort for the user. Moreover, the user may not need to adjust the volume repeatedly during remote audio interaction, which greatly optimizes the user experience.

In some embodiments, the first parameter can be greater than, less than, or equal to the third parameter. The second parameter can be greater than, less than, or equal to the fourth parameter. The first method and the second method being different can include at least one of adjustment trends of the audio parameter being inconsistent, adjustment amplitudes of the audio parameter being inconsistent, or adjustment ratios of the audio parameter being inconsistent.

In some embodiments, the condition detection module can be configured to determine that the condition is satisfied when at least one of the user operation instruction, a difference between any two or more parameters of the obtained audios exceeding the first threshold, or the parameter of at least one of the plurality of audios exceeding the second threshold is satisfied.

In some embodiments, the first communication object and the second communication object can include at least one of two different terminal devices or different sound sources corresponding to the same terminal device.

In some embodiments, the state switch module can include a target value determination module configured to determine the target value according to the obtained audio, a parameter determination module configured to adjust the first parameter of the first audio to the third parameter and adjust the second parameter of the second audio to the fourth parameter based on the target value, and an audio output module configured to control to output the first audio with the third parameter and the second audio with the fourth parameter.

In some embodiments, the target value determination module can be configured to determine the volume value of the first audio sampling data as the target value of the first sampling period for the first audio sampling data of the received audio data, and determine the average of the volume value of the current audio sampling data and the target value of the last sampling period as the target value of the current audio sampling period for the other audio sampling data except the first audio sampling data of the received audio data.

In some embodiments, when at least two pieces of audio data are included in the same time period, the target value determination module can be configured to calculate the average volume value of the at least two pieces of audio sampling data from different communication objects corresponding to the current sampling period to obtain the target value corresponding to the current sampling period.

In some embodiments, the state switch module can be configured to obtain the adjustment instruction and adjust the output parameter of the first audio from the first communication object from the first parameter to the third parameter according to the adjustment instruction. The adjustment instruction can be the instruction associated with an identification of the first communication object on the interface.

In some embodiments, the state switch module can be configured to determine an audio parameter adjustment reference according to at least one of historical data, environmental data, or received audio data and adjust the output parameter of the first audio and the output parameter of the second audio based on the adjustment reference.

In some embodiments, the processing device can include a processor and a memory. The condition detection module, the state switch module, the target value determination module, the parameter determination module, and the audio output module can be used as program modules to be stored in the memory. The processor can be configured to execute the program modules stored in the memory to realize the corresponding functions.

The processor can include a kernel. The kernel can be configured to retrieve the corresponding program modules from the memory. One or more kernels can be included. The retrieved data can be processed by adjusting the parameters of the one or more kernels.

The memory can include non-permanent memory of computer-readable media, such as random access memory (RAM) and/or non-volatile memory, such as read-only memory (ROM) or flash memory. The memory can include at least one memory chip.

Embodiments of the present disclosure further provide a computer-readable storage medium, which can be directly loaded into the internal memory of the computer. The computer-readable storage medium can include software codes. After the computer program is loaded and executed by the computer, the computer can perform the processing method of embodiments of the present disclosure.

Embodiments of the present disclosure further provide a computer program product including software codes, which can be directly loaded into the internal memory of the computer. After the computer program is loaded and executed by the computer, the computer can perform the processing method of embodiments of the present disclosure.

Figure 6:
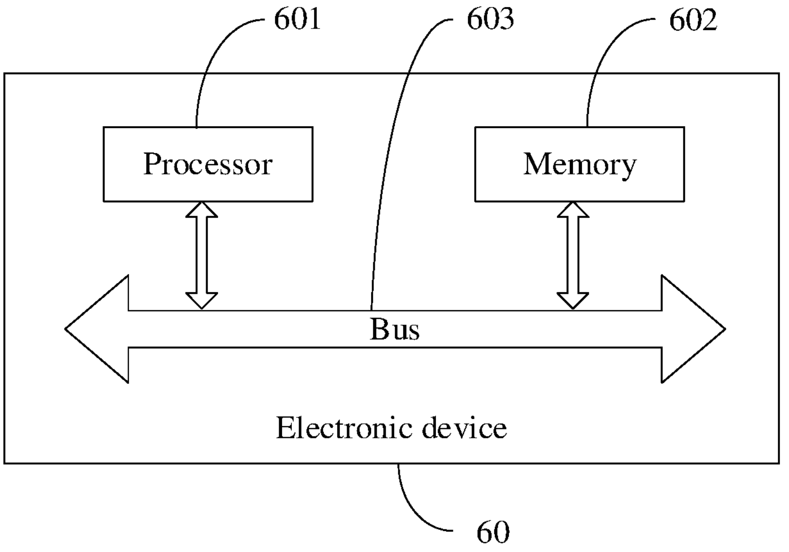
FIG. 6 illustrates a schematic structural diagram of an electronic device according to some embodiments of the present disclosure.

Furthermore, embodiments of the present disclosure provide an electronic device. FIG. 6 illustrates a schematic structural diagram of the electronic device according to some embodiments of the present disclosure. As shown in FIG. 6, the electronic device includes one or more processors 601, one or more memories 602 connected to the one or more processors, and a bus 603. The one or more processors and the one or more memories can communicate with each other via the bus. The one or more processors can be configured to call the program instructions in the one or more memories to execute the processing method of embodiments of the present disclosure.

Embodiments of the present disclosure are described in a progressive manner. Each embodiment focuses on the differences from other embodiments Similar or identical parts between different embodiments can be referenced to each other. For the device of embodiments of the present disclosure, since the device corresponds to method embodiments, the description of the device can be simple, and the relevant parts can be referred to method embodiments.

In the specification, relational terms such as first and second are used merely to distinguish one entity or operation from another entity or operation and do not necessarily imply any actual relationship or sequence between these entities or operations. Furthermore, terms such as "including," "comprising," or any other variant thereof are intended to encompass non-exclusive inclusion, such that a process, method, article, or device that includes a series of elements includes not only those elements explicitly listed, but also other elements that are not explicitly listed but are inherently present in such process, method, article, or device. Unless otherwise specified, an element limited by the phrase "including a . . . " does not exclude the presence of an additional identical element in the process, method, article, or device that includes the element.

The steps of the methods or algorithms of embodiments of the present disclosure can be implemented directly in hardware, software modules executed by the processor, or a combination thereof. The software modules can be stored in random access memory (RAM), memory, read-only memory (ROM), electrically programmable ROM, electrically erasable programmable ROM, registers, hard drives, removable disks, CD-ROMs, or any other form of storage media known in the art.

The description of embodiments of the present disclosure can enable those skilled in the art to implement or use the present disclosure. Various modifications to these embodiments are obvious for those skilled in the art. The general principles defined in the specification can be implemented in other embodiments without departing from the spirit or scope of the present disclosure. Therefore, the present disclosure is not limited to embodiments of the present disclosure, but should conform to the widest scope consistent with the principles and novel features of the present disclosure.

What is claimed is:

1. A processing method comprising:

detecting whether a condition is satisfied; and in response to the condition being satisfied, controlling an electronic device to switch from a first state to a second state;

wherein:

in the first state, the electronic device is configured to output a first audio from a first communication object with a first parameter and a second audio from a second communication object with a second parameter;

in the second state, the electronic device is configured to output the first audio from the first communication object with a third parameter and the second audio from the second communication object with a fourth parameter;

switching the electronic device from the first state to the second state includes adjusting the first parameter to the third parameter in a first method and adjusting the second parameter to the fourth parameter in a second method, the first parameter and the third parameter representing an output volume of the first audio, the second parameter and the fourth parameter representing an output volume of the second audio, the first method and the second method being different; and the first parameter is different from the third parameter.

2. The processing method according to claim 1, wherein:

the first parameter is greater than or less than the third parameter;

the second parameter is greater than, less than, or equal to the fourth parameter; and the first method and the second method being different includes at least one of adjustment trends for audio parameters being inconsistent, adjustment amplitudes for the audio parameters being inconsistent, and adjustment ratios for the audio parameters being inconsistent.

3. The processing method according to claim 1, further comprising:

determining that the condition is satisfied when at least one of an obtained user operation instruction, a difference between any two or more of a plurality of obtained audios exceeding a first threshold, or a parameter of at least one of the plurality of obtained audios exceeding a second threshold is satisfied.

4. The processing method according to claim 1, wherein the first communication object and the second communication object include at least one of two different terminal devices and different sound sources corresponding to a same terminal device.

5. The processing method according to claim 1, wherein controlling the electronic device to switch from the first state to the second state includes:

determining a target value according to an obtained audio;

adjusting the first parameter of the first audio to the third parameter based on the target value and adjusting the second parameter of the second audio to the fourth parameter based on the target value; and outputting the first audio with the third parameter and the second audio with the fourth parameter.

6. The processing method according to claim 5, wherein determining the target value according to the obtained audio includes:

for first audio sampling data of received audio data, determining a volume value of the first audio sampling data as a target value of a first sampling period; and for other audio sampling data of the received audio data except for the first audio sampling data, determining an average value of a volume value of current audio sampling data and a target value of a last sampling period as a target value of a current sampling period.

7. The processing method according to claim 5, wherein determining the target value according to the obtained audio, when at least two pieces of audio data are included at a same time, includes:

averaging volume values of at least two pieces of audio sampling data from different communication objects corresponding to a current sampling period to obtain a target value corresponding to the current sampling period.

8. The processing method according to claim 1, wherein controlling the electronic device to switch from the first state to the second state includes:

obtaining an adjustment instruction associated with an identification of the first communication object on an interaction interface; and adjusting an output parameter of the first audio of the first communication object from the first parameter to the third parameter based on the adjustment instruction.

9. The processing method according to claim 1, wherein controlling the electronic device to switch from the first state to the second state includes:

determining an audio parameter adjustment reference according to at least one of historical data, environmental data, and obtained audio data; and adjusting an output parameter of the first audio and an output parameter the second audio based on the adjustment reference.

10. An electronic device comprising:

one or more processors; and one or more memories storing program codes that, when executed by the one or more processors, cause the one or more processors to:

detect whether a condition is satisfied; and in response to the condition being satisfied, control an electronic device to switch from a first state to a second state;

wherein:

in the first state, the electronic device is configured to output a first audio from a first communication object with a first parameter and a second audio from a second communication object with a second parameter;

in the second state, the electronic device is configured to output the first audio from the first communication object with a third parameter and the second audio from the second communication object with a fourth parameter;

switching the electronic device from the first state to the second state includes adjusting the first parameter to the third parameter in a first method and adjusting the second parameter to the fourth parameter in a second method, the first parameter and the third parameter representing an output volume of the first audio, the second parameter and the fourth parameter representing an output volume of the second audio, the first method and the second method being different; and the first parameter is different from the third parameter.

11. The device according to claim 10, wherein:

the first parameter is greater than or less than the third parameter;

the second parameter is greater than, less than, or equal to the fourth parameter; and the first method and the second method being different includes at least one of adjustment trends for audio parameters being inconsistent, adjustment amplitudes for the audio parameters being inconsistent, and adjustment ratios for the audio parameters being inconsistent.

12. The device according to claim 10, wherein the one or more processors are further configured to:

determine that the condition is satisfied when at least one of an obtained user operation instruction, a difference between any two or more of a plurality of obtained audios exceeding a first threshold, or a parameter of at least one of the plurality of obtained audios exceeding a second threshold is satisfied.

13. The device according to claim 10, wherein the first communication object and the second communication object include at least one of two different terminal devices and different sound sources corresponding to a same terminal device.

14. The device according to claim 10, wherein the one or more processors are further configured to:

determine a target value according to an obtained audio;

adjust the first parameter of the first audio to the third parameter based on the target value and adjust the second parameter of the second audio to the fourth parameter based on the target value; and output the first audio with the third parameter and the second audio with the fourth parameter.

15. The device according to claim 14, wherein the one or more processors are further configured to:

for first audio sampling data of received audio data, determine a volume value of the first audio sampling data as a target value of a first sampling period; and for other audio sampling data of the received audio data except for the first audio sampling data, determine an average value of a volume value of current audio sampling data and a target value of a last sampling period as a target value of a current sampling period.

16. The device according to claim 14, wherein the one or more processors are further configured to:

average volume values of at least two pieces of audio sampling data from different communication objects corresponding to a current sampling period to obtain a target value corresponding to the current sampling period.

17. The device according to claim 10, wherein the one or more processors are further configured to:

obtain an adjustment instruction associated with an identification of the first communication object on an interaction interface; and adjust an output parameter of the first audio of the first communication object from the first parameter to the third parameter based on the adjustment instruction.

18. The device according to claim 10, wherein the one or more processors are further configured to:

determine an audio parameter adjustment reference according to at least one of historical data, environmental data, and obtained audio data; and adjust an output parameter of the first audio and an output parameter the second audio based on the adjustment reference.

19. A non-transitory computer-readable storage medium storing a computer program that, when executed by one or more processors, causes the one or more processors to:

detect whether a condition is satisfied; and in response to the condition being satisfied, control an electronic device to switch from a first state to a second state;

wherein:

in the first state, the electronic device is configured to output a first audio from a first communication object with a first parameter and a second audio from a second communication object with a second parameter;

in the second state, the electronic device is configured to output the first audio from the first communication object with a third parameter and the second audio from the second communication object with a fourth parameter;

switching the electronic device from the first state to the second state includes adjusting the first parameter to the third parameter in a first method and adjusting the second parameter to the fourth parameter in a second method, the first parameter and the third parameter representing an output volume of the first audio, the second parameter and the fourth parameter representing an output volume of the second audio, the first method and the second method being different; and the first parameter is different from the third parameter.

20. The storage medium according to claim 19, wherein:

the first parameter is greater than or less than the third parameter;

the second parameter is greater than, less than, or equal to the fourth parameter; and the first method and the second method being different includes at least one of adjustment trends for audio parameters being inconsistent, adjustment amplitudes for the audio parameters being inconsistent, and adjustment ratios for the audio parameters being inconsistent.

* * * * *